(12) United States Patent
Etscheid et al.

(10) Patent No.: US 8,890,039 B2
(45) Date of Patent: Nov. 18, 2014

(54) METHOD AND HEATING SYSTEM FOR HEATING A FLUID LINE SYSTEM, PARTICULARLY IN A MOTOR VEHICLE

(75) Inventors: Tobias Etscheid, Lindlar (DE); Olav Borgmeier, Hückeswagen (DE); Thomas Schüler, Wetter (DE)

(73) Assignee: VOSS Automotive GmbH, Wipperfürth (DE)

( * ) Notice: Subject to any disclaimer, the term of this patent is extended or adjusted under 35 U.S.C. 154(b) by 814 days.

(21) Appl. No.: 13/132,033

(22) PCT Filed: Nov. 25, 2009

(86) PCT No.: PCT/EP2009/065844
§ 371 (c)(1),
(2), (4) Date: Jun. 30, 2011

(87) PCT Pub. No.: WO2010/063629
PCT Pub. Date: Jun. 10, 2010

(65) Prior Publication Data
US 2011/0248017 A1    Oct. 13, 2011

(30) Foreign Application Priority Data
Dec. 1, 2008  (DE) .......................... 10 2008 059 751

(51) Int. Cl.
*H05B 1/02* (2006.01)
*F16L 53/00* (2006.01)
*G05D 23/19* (2006.01)
*G05D 23/24* (2006.01)

(52) U.S. Cl.
CPC .......... *G05D 23/1912* (2013.01); *F16L 53/008* (2013.01); *G05D 23/2415* (2013.01)
USPC ........... 219/492; 219/202; 219/486; 392/480; 392/490

(58) Field of Classification Search
CPC    G05D 23/2415; G05D 23/1912; F16L 53/00; H05B 1/0236; H05B 3/0019; H05B 3/026; H05B 3/58; H05B 2203/007
USPC ......... 219/492, 497, 505, 202, 205, 483–487, 219/508; 392/480, 472, 479, 485, 490
See application file for complete search history.

(56) References Cited

U.S. PATENT DOCUMENTS

| 4,086,466 | A | * | 4/1978 | Scharlack | ...................... 219/494 |
| 4,978,837 | A | * | 12/1990 | Eggleston | ...................... 219/497 |

(Continued)

FOREIGN PATENT DOCUMENTS

| DE | 31 39 199 | 4/1983 |
| DE | 40 22 759 | 1/1992 |

(Continued)

OTHER PUBLICATIONS

International Search Report for PCT/EP2009/065844, Mailed May 16, 2011, two pages.

*Primary Examiner* — Mark Paschall
(74) *Attorney, Agent, or Firm* — Brinks Gilson & Lione

(57) ABSTRACT

A method for heating a fluid line system with at least two electric heating elements ($R_1$, $R_2$, $R_3$), which are operated electrically in parallel and each heating element ($R_1/R_2/R_3$) is separately supplied with a controlled operating current ($I_1/I_2/I_3$) for adjusting its heating power. Furthermore, the invention relates to a heating system for such a fluid line system (1), in particular for the application of the method according to the present invention. The heating system has heating elements ($R_1$-$R_3$) which are electrically connected in parallel and are each connected to a separate control element ($T_1$, $T_2$, $T_3$). Each heating element ($R_1/R_2/R_3$) can be controlled via its associated control element ($T_1$, $T_2$, $T_3$) for the individual adjustment of its heating power.

11 Claims, 5 Drawing Sheets

(56) References Cited

U.S. PATENT DOCUMENTS

| | | | |
|---|---|---|---|
| 6,246,831 B1* | 6/2001 | Seitz et al. | 392/486 |
| 6,580,059 B1* | 6/2003 | Kanno | 219/486 |
| 6,818,869 B2* | 11/2004 | Patti et al. | 219/489 |
| 6,927,368 B2* | 8/2005 | Cao et al. | 219/492 |
| 7,167,776 B2* | 1/2007 | Maharajh et al. | 700/266 |
| 7,442,902 B2* | 10/2008 | Stearns et al. | 219/490 |
| 7,626,144 B2* | 12/2009 | Merzliakov | 219/483 |

FOREIGN PATENT DOCUMENTS

| | | |
|---|---|---|
| DE | 40 34 635 | 6/1992 |
| DE | 41 35 082 | 12/1992 |
| EP | 1 764 541 | 3/2007 |
| EP | 1 985 908 | 10/2008 |
| GB | 2 154 813 | 9/1985 |
| WO | WO 2007/073286 | 6/2007 |
| WO | WO 2009/040223 | 4/2009 |

* cited by examiner

METHOD AND HEATING SYSTEM FOR HEATING A FLUID LINE SYSTEM, PARTICULARLY IN A MOTOR VEHICLE

BACKGROUND

1. Field of the Invention

The present invention first relates to a method for heating a fluid line system with at least two electric heating elements.

Furthermore, the invention also relates to a heating system for a fluid line system with at least two electric heating elements, and, in particular, for application of the method according to the present invention.

2. Related Technology

For the related technology, reference is made to documents DE 41 35 082 C1, WO 2007/073286 A1, EP 1 985 908 A1 and also EP 1 765 541 A1, for example.

Heatable fluid line systems are, in particular, frequently used in motor vehicles, namely for such media that tend to freeze even at relatively high ambient temperatures due to their freezing point. Thus, certain functions can be affected. This is the case, for example, with water lines for the windshield washer system, but especially also for lines for aqueous urea solution which is used as a $NO_x$-reduction additive for diesel engines with so-called SCR catalyst units. Therefore, the electric heating elements can be activated at low temperatures in order to prevent freezing, or to thaw an already frozen medium.

Fluid line systems of this kind usually consist of at least one fluid line (tubing or hose line)—cf. in particular EP 1 985 908 A1 (FIGS. 13, 14) and also WP 2007/073286 A1—with two line connectors (plug connectors) at the ends. The fluid line has an electric heating element in the form of a helical heating wire wrapping over the length of the line, for example, and/or at least one of the line connectors (WP 2007/073286 A1) and/or each of the two connectors (EP 1 985 908 A1) is likewise provided with an electric heating element, in particular in the form of a heating wire wrapping. Usually all heating elements are electrically connected in series and can be connected to a common current and/or voltage supply (cf. in particular EP 1 985 908 A1, FIGS. 14a, 14b). This raises the problem that, in terms of their heating power, the individual heating elements have to be designed specifically for the particular line system, namely in adaptation to the length of the respective fluid line. This results in a great effort for providing different embodiments.

Document EP 1 764 541 A1 describes a heatable fluid line in which there is at least one electric heating conductor at the perimeter of the conducting tube and at least two electric supply lines running in the longitudinal direction of the conducting tube, wherein the heating conductor is alternatingly connected electrically to one of the two power supply lines, namely alternatingly to the plus pole and minus pole of the supply voltage. In this regard the connecting points seen in the longitudinal direction of the conducting tube are arranged equally spaced and one behind the other. The electric heating conductor is connected to the supply lines e.g. by soldering, welding or crimping. Due to this configuration, the fluid line has a constant heating power per length unit. As a result, the fluid line can be prefabricated in large lengths and cut to the required length, wherein each cut-to-length line length has the same heating power per length unit. This known fluid line has, however, the disadvantage that relatively high material costs will result, since in addition to the electric heating conductor or to the heating conductors, at least two supply lines have to be respectively be provided. An increased manufacturing effort also results from the required alternating connection points between the heating conductor and the supply lines. Each heatable fluid line prefabricated in this way has a defined heating power per length unit. But if different heating powers per length unit are required for different applications, prefabrication of differently heatable fluid lines with the respectively required heating power per length unit is necessary, so that the prefabricated fluid lines have to be stocked up or stored. This results in additionally increased production costs.

SUMMARY

The underlying object of the present in invention is to avoid the described disadvantages and to provide a method and a heating system for heating a fluid line system, in order to optimize the electric heating power in a simple and very particularly economical and very effective manner largely independently of the length of the line and the number of electric heating elements.

According to the present invention, this object is first attained by the method, wherein the heating elements are operated electrically in parallel and each heating element is supplied separately with a controlled, in particular regulated operating current for the adjustment of its heating power. For this purpose, each heating element is preferably supplied separately with its separate operating voltage, wherein each operating voltage is generated from a supply voltage (in particular DC voltage from a vehicle battery) by a PWM (pulse width modulated) control clocked to regulate the heating power with a defined mark-to-space ratio. Thus, the respective operating current results from an effective value of the clocked pulsed operating voltage and a respective existing temperature-dependent resistance of the heating element.

The respective actual heating power of each heating element can advantageously be regulated via a power regulator by varying the PWM mark-to-space ratio to a predefined desired heating power.

According to another aspect, a heating system according to the present invention is characterized in that heating elements are electrically connected in parallel and each via a separate control element for the individual adjustment and in particular regulation of its heating power. For this purpose, the control elements are controlled by a regulator unit for regulating the heating power of the heating elements.

Further advantageous embodiments of the invention are contained in the dependent claims and in the description below.

BRIEF DESCRIPTION OF THE DRAWINGS

The invention will be explained in greater detail below with reference to the drawings. The drawings show.

DETAILED DESCRIPTION

Figure 1:
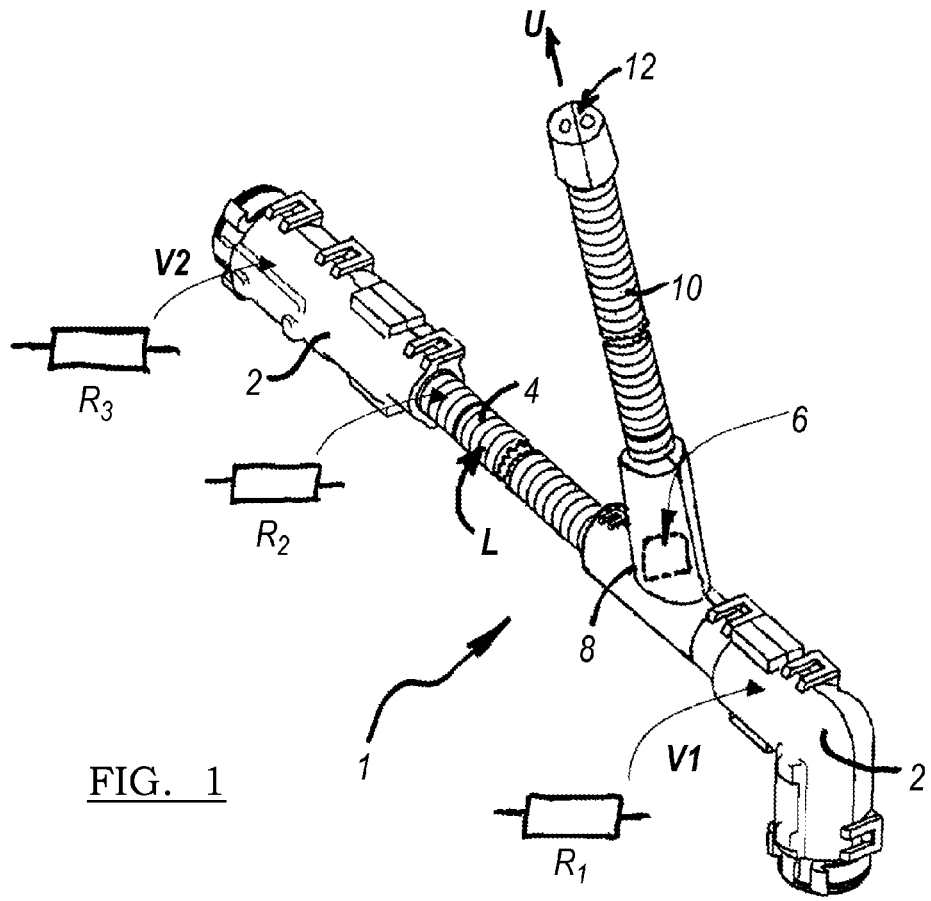
FIG. 1 is a perspective illustration of an exemplary embodiment of an electrically heatable fluid line system with a heating system having three additional heating elements illustrated schematically as switching symbols.

Throughout this specification, the same parts are always identified by the same reference numerals in the different drawings.

FIG. 1 shows, for example, a fluid line system 1 which consists of a set of lines with a fluid line L and two line connectors $V_1$ and $V_2$ at the ends, as well as of electric heating means. As heating means, each fluid connector $V_1$, $V_2$ has an electric heating element $R_1$ and/or $R_3$, and the fluid line L is provided with an additional heating element $R_2$. All heating elements (heating resistors) can preferably consist of a heating wire wrapping. It is advantageous if the heating elements $R_1$, $R_3$ of the line connectors $V_1$, $V_2$ are each encapsulated with an external housing 2, and the fluid line L has an outer casing 4 surrounding the heating element $R_2$, for example, in the shape of a corrugated tube.

Inside a vehicle and in the preferred application for an SCR-catalyst system, several individual line systems 1 normally form a complete line system, namely for the required fluid connections between a tank and a conveying module (with inlet and return) and between the conveying module and a dosing unit (as an individual line or also with inlet and return), wherein the dosing unit doses the SCR reduction additive into an exhaust tract. Depending on the arrangement of the aggregate systems to be connected within the respective motor vehicle, very different lengths of the individual lines may be necessary, which also has an effect on the resistances of the respective heating elements and thus also—with a predefined supply voltage—on their heating power.

Figure 2:
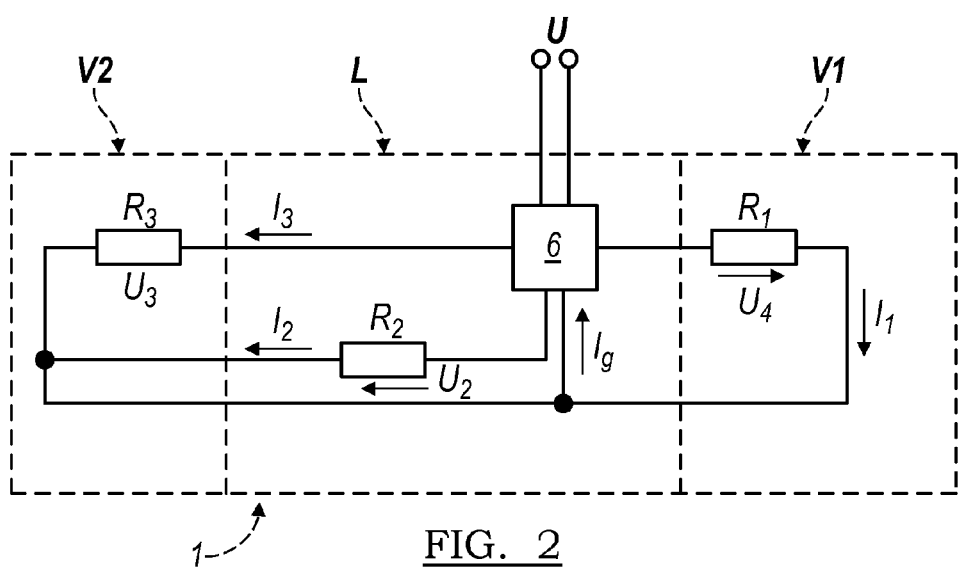
FIG. 2 is a schematic circuit diagram of the line- and heating system according to FIG. 1.
Figure 3:
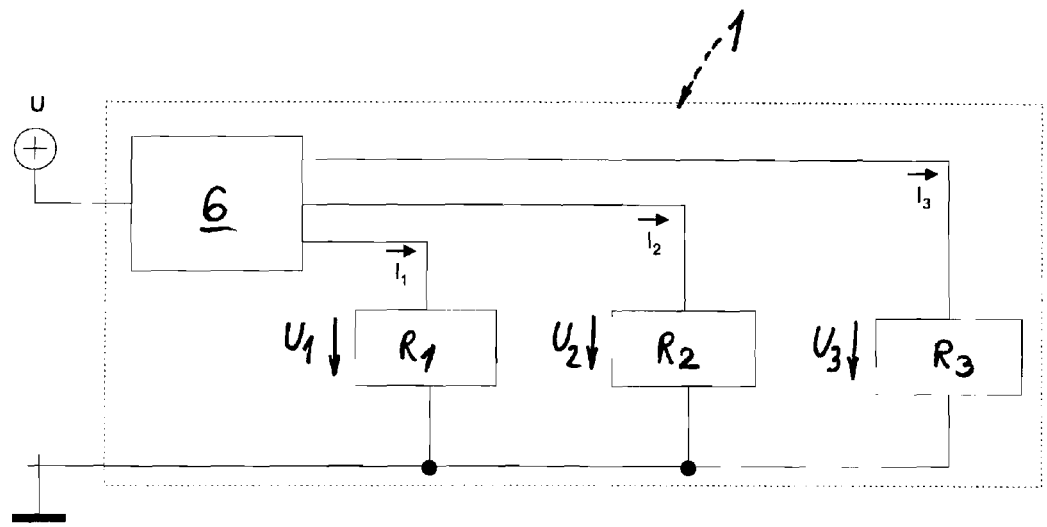
FIG. 3 is a simplified representation of another circuit diagram of a heating system according to the present invention.
Figure 4:
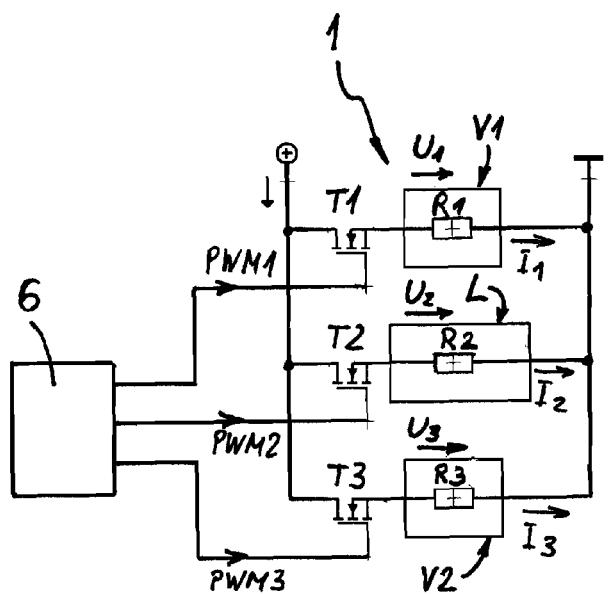
FIG. 4 is a basic circuit diagram as explanation of the control of the heating elements connected in parallel.

According to the present invention, as shown in FIGS. 2 to 4 it is provided that the heating elements $R_1$, $R_2$, $R_3$ are electrically connected in parallel and are each connected to a separate control element $T_1$, $T_2$, $T_3$ (see FIG. 4) formed preferably by a transistor, wherein each heating element $R_1$, $R_2$, $R_3$ can be controlled via its associated control element $T_1$, $T_2$, $T_3$ for the individual adjustment of its heating power. As a result of this, the heating power can be held constant or adjusted to certain conditions, such as, in particular, the respective outside or ambient temperature, namely preferably individually for each individual heating element of the line system 1. In addition, the heating power can thus be adjusted independently of the respective operating voltage. The control elements $T_1$ to $T_3$ are preferably each separately and individually controllable by one regulating unit 6 for regulating the heating power of the individual heating elements $R_1$ to $R_3$, whose regulating variable thus is the respective heating power, by calculating the respective, actual heating power as an actual value and regulating it to a predefined desired heating power (desired value). Thus, a concrete, previously determined heating power (P=U·I) can be predefined taking into account certain parameters (such as line length, ambient temperature or such). But it is also possible to specify a different physical parameter (e.g. geometric parameter, such as material, number, diameter and length of the heat conductors, the outside or ambient temperature, operating temperature of the SCR system and/or a pre-determined thawing time) as a desired value, wherein this desired value is then automatically transformed into a desired heating power and/or into an effective voltage by the system.

As is evident from FIG. 1, for example, the regulating unit 6 can be accommodated in a connection housing 8 arranged in the line area and be connectable to a supply voltage U (see FIGS. 2 and 3) via electric connection lines running inside a casing 10 (e.g. corrugated tube) and via plug connections 12. The connection housing 8 can be arranged at any particular point of the fluid line L, i.e., also spaced apart from the line connectors $V_1$, $V_2$. The control unit 6 can, however, also be accommodated in the housing 2 of one of the line connectors $V_1$, $V_2$.

The regulator according to the present invention is primarily based on a PWM-driver of the control elements $T_1$ to $T_3$, that is, on a pulse width-modulated driver with variable switching pulses with respect to its time width. For this purpose, a supply voltage U—in a vehicle, the battery voltage of 9 to 16 V or 20 to 32 V for example—is clocked via the control elements $T_1$ to $T_3$ to the individual heating elements $R_1$ to $R_3$. The regulation takes place here by varying the so-called mark-to-space ratio and/or the degree of modulation m.

Figure 9:
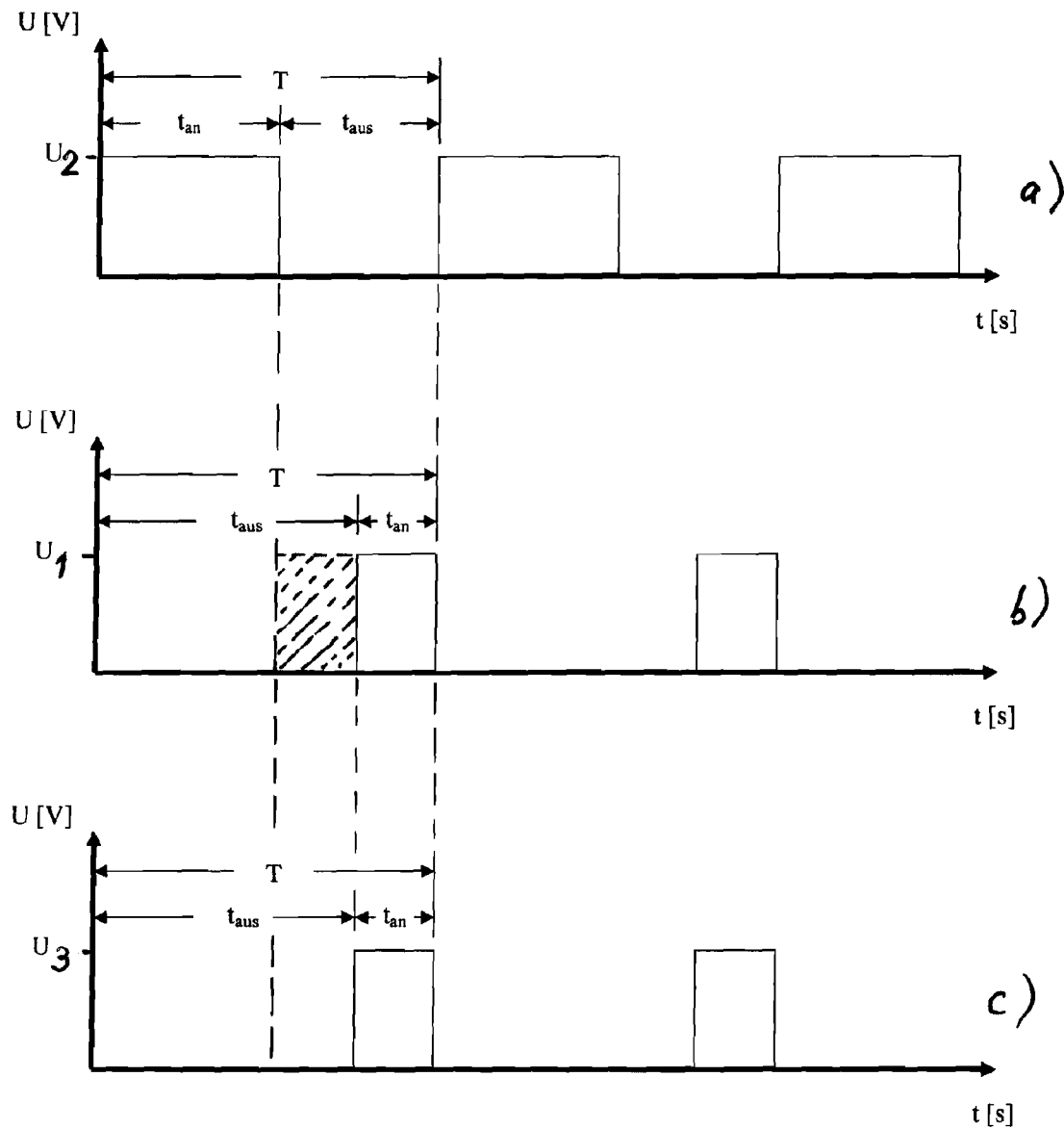
FIGS. 9(a), (b) and (c) are diagrams illustrating the PWM modulation of the supply voltage to generate the modulated operating voltages for the heating elements.

In this regard reference is made to FIG. 9, according to which a pulse with a variable switching time $t_{an}$ is generated within an complete switching period T. The remaining time is called the switch-off time $t_{aus}$. Thus the mark-to-space ratio is defined as:

$$m = \frac{t_{an}}{T}$$

Thus, m can be a value in the range from 0 to 1. The voltage pulses formed in this way result in an effective value $U_{eff}$=m·U, which thus can be in the range from 0% to 100% of the supply voltage U.

If the heating elements $R_1$ to $R_3$ are now supplied with the respective clocked operating voltages $U_1$, $U_2$, $U_3$ then according to Ohm's law:

$$I_{eff} = \frac{U_{eff}}{R}$$

the result is an effective current $I_1$ to $I_3$ (see FIG. 3) which results from the respective effective value of the operating voltage divided by the respective existing temperature-dependent resistance (R(T)) of the respective heating element $R_1$ to $R_3$. For the heating power of the respective heating element, this means:

$$P = m \cdot U \cdot I = m \cdot \frac{U^2}{R(T)} = m \cdot I^2 \cdot R(T)$$

From this equation we obtain approximate rectangular pulses for voltage and current, each with only two states, temporarily full supply voltage/full current, and temporarily no voltage/current (pauses).

Figure 6:
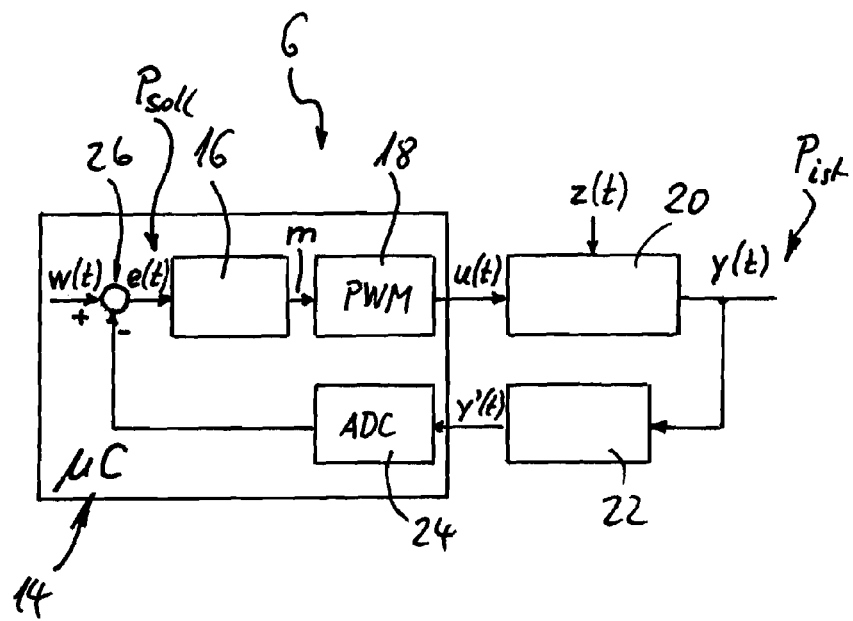
FIG. 6 is a simplified block circuit diagram of the basic principle of the regulating unit.

The principle for the regulation according to the present invention is shown in simplified form in FIG. 6. A microcontroller 14 is integrated in the regulation circuit and contains one regulator 16 for the mark-to-space ratio m of a PWM modulator 18, which outputs an actuating variable u(t) for a downstream regulating path 20. The actual value at the end of the regulating path 20 is picked up by a sensor 22 as a controlled process variable y(t) and is then preferably sent via an A/D-converter 24 as an adjusted process feedback variable y'(t) to the regulator 16 and/or to an adding unit 26, which uses this variable and a desired value (control variable) w(t) to create a regulating difference e(t)=w(t)−y(t) for the regulator 16. z(t) represents an disturbance variable which is (at least) a variable acting externally on the system, such as the outside temperature (external ambient temperature). Thus, the headwind will produce larger losses of heat. In certain areas heat stagnation can also occur. In addition, there can be temperature-dependent fluctuations in the resistance of the heating elements ($R_{min}/R_{max}$).

The heating power is the control variable of the power regulator (regulator unit 6). As command variable/desired value (characteristic diagram) w(t) and/or for the determination thereof, the following optional variables can be used (in combination if necessary):
  effective voltage
  temperature of the heating element, of the fluid, of the fluid line and/or of the line connector
  a predefined thawing time (especially in combination with the effective voltage)
  heating power
  resistance of the heating element ($R_{min}/R_{max}$)
  geometric parameters (heating element: type, material, number, diameter and length of heat conductors)
  ambient temperature operating temperature of the fluid system.

The output from the regulating path 20 is held constant. It is thus the principle of fixed value regulation, wherein the command variable w(t) is predefined. By using a fixed value regulator, it is advantageously possible to adjust the regulator by changing only one parameter, namely the command variable w(t), in case of changes in the area of the fluid line system 1 and/or in case of changes in the area of the heat transfer between the heating element and the line system.

Figure 5:
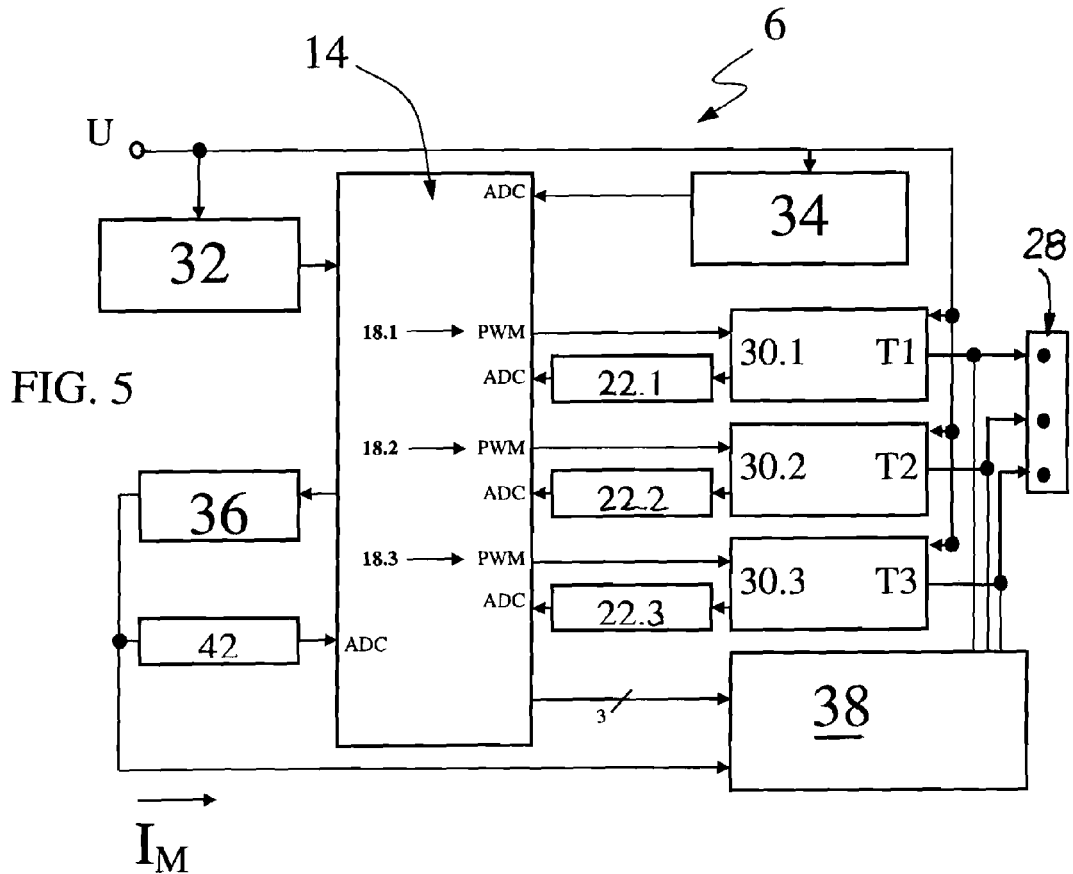
FIG. 5 is a block circuit diagram of a regulating unit according to the present invention.

FIG. 5 shows an exemplary block diagram for regulating three heating elements, which are themselves not illustrated in FIG. 5, but that can be connected via a plug-in connector 28. One driver circuit 30 (30.1, 30.2 and 30.3) with the respective control elements $T_1$, $T_2$, $T_3$ is provided for each heating element. Each driver circuit 30 can be implemented with the respective control element $T_1$, $T_2$ and/or $T_3$ as a "high-side" driver (cf. FIG. 7). The microcontroller 14 contains a separate PWM-modulator 18.1, 18.2, 18.3 for each driver circuit 30. Each driver circuit 30 in the illustrated example is connected via a sensor 22.1, 22.2, 22.3 to a separate input ADC of the microcontroller 14. Alternatively, a multiplexer operation is possible via a common input ADC. The supply voltage U is converted via a voltage regulator 32 into a supply voltage of, in particular, 5V, and sent to the microcontroller 14. In addition, the supply voltage U is also sent to all driver circuits 30. Furthermore, a voltage splitter 34 is provided for monitoring the supply voltage U and for detecting the input voltage level because they can have different levels in different vehicles. The driver circuits 30 control the heating power of each heating element.

As is also apparent from FIG. 5, the microcontroller 14 is additionally connected to a constant power supply 36 whose output can be optionally switched to each heating element via a switching device 38.

Figure 7:
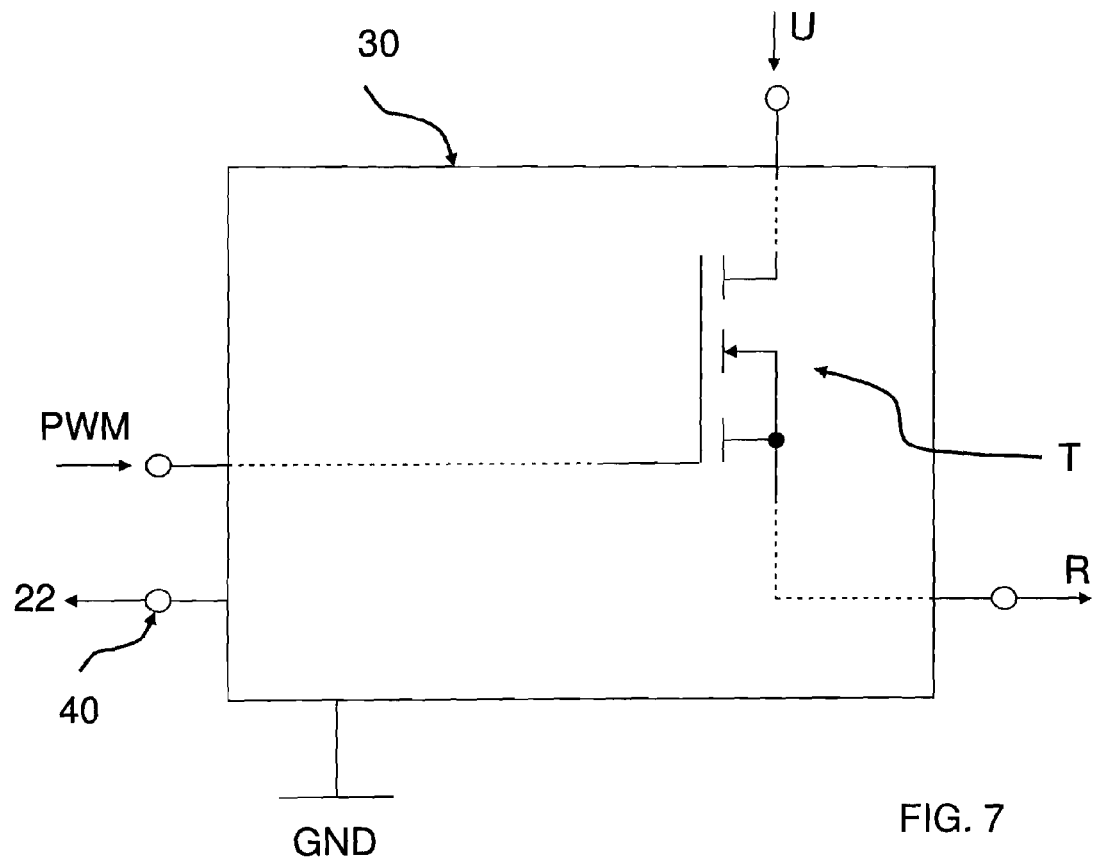
FIG. 7 is a schematic block representation of a driver stage.

FIG. 7 illustrates one of the driver circuits 30 in a highly simplified manner. It should be noted in this regard that the driver circuit has a special output 40 for a sensor signal proportional to the respective operating current of the heating element which is supplied to the sensor 22.

The operation of the regulator will be explained in more detail below.

To determine the respectively required mark-to-space ratio m, on the one hand, the existing resistance R(t) is determined once separately for each heating element $R_1$ to $R_3$ in one measuring cycle for initialization at the start of operation, as well as, on the other hand, cyclically during operation. From these values and with the applied supply voltage U, the PWM mark-to-space ratio m is determined for the predefined desired heating power $P_{soll}$. For this purpose, in each measurement cycle with the operating current $I_1$ to $I_3$ shut off temporarily, a defined constant measuring current $I_M$ is sent from the constant power source 36 via the switching device 38 through the respective heating element. The resulting voltage $U_M$ is sent via an operating amplifier 42 to an ADC input of the microcontroller 14 and is used for evaluating the current performance data. From the constant measuring current and the associated voltage drop, the present resistance can be determined according to Ohm's law:

$$R(T) = \frac{U_M}{I_M}$$

The desired heating power $P_{soll}$ required for the PWM mark-to-space ratio m can then be determined from the product of desired heating power multiplied by the existing resistance divided by the square of the supply voltage; having:

$$m = P_{soll} \cdot \frac{R(T)}{U^2}$$

Subsequently to each measurement cycle, the operating voltage is generated for each heating element $R_n$ with the obtained mark-to-space ratio $m_n$: $U_n = m_n \cdot U$.

The output 40 of each driver circuit 30 mentioned above then provides—during operation—a current signal which represents a reference current proportional to the respective operating current (actual value). The downstream sensor 22 integrates this reference current to create a voltage average. The voltage average can, however, alternatively also be calculated. From these values the actual value of the respective heating power can then be determined with $P_{ist} = m_n \cdot I^2_n \cdot R(T)$. The regulator then regulates the actual value to the predefined desired heating power by varying the mark-to-space ratio m.

As is still evident from the diagrams in FIG. 9, the heating elements are preferably driven at a time offset with respect to the PWM control, such that their PWM signals (cf. FIG. 9 the voltage pulses $U_1$, $U_2$ and $U_3$) do not, or only partly overlap in time. For example, it is possible to drive the heating elements $R_1$ and $R_3$ with operating voltages $U_1$ and $U_3$ during the pause times of the control of the heating element $R_2$ and/or of its operating voltage $U_2$, wherein in contrast to the illustration in FIG. 9, the voltage pulses $U_1$ and $U_3$ of the parts diagrams b) and c) can be offset in time to one another within the pause of $U_2$ according to diagram a) (see the voltage pulse for $U_1$ shown hatched and with dashed lines in diagram b)). Due to this measure, the maximum total current of the heating system is advantageously kept small.

Figure 8:
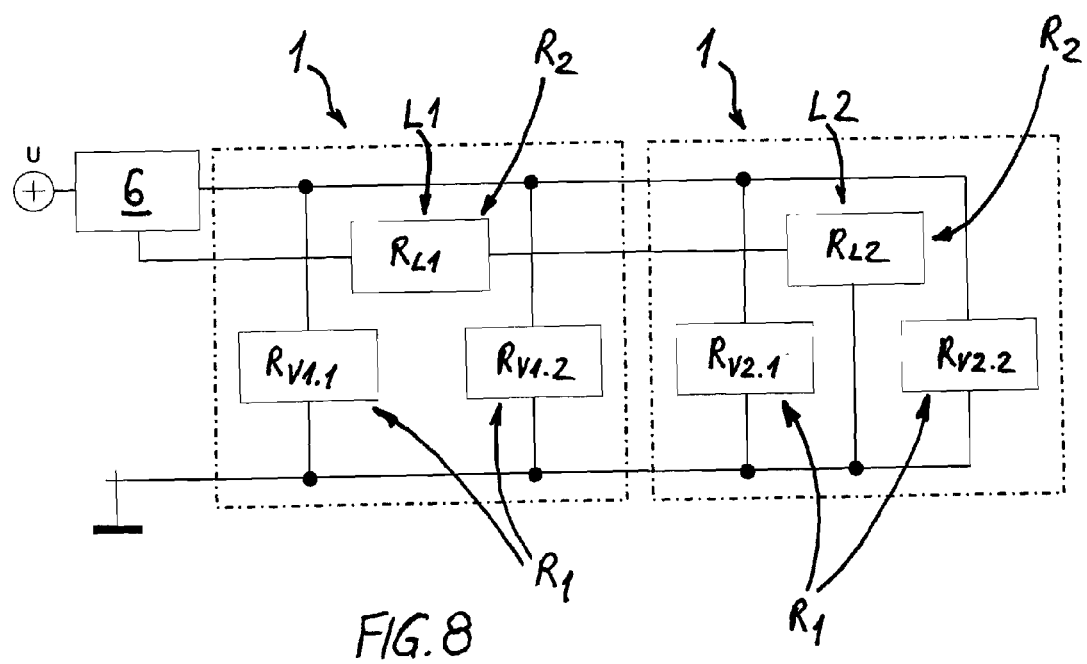
FIG. 8 is a circuit diagram similar to FIG. 3 with an alternative connection of the available heating elements.

As is illustrated by way of example in FIG. 8, the heating elements $R_1$, $R_2$ can each consist of several individual heating elements which can be connected in series and/or in parallel. For instance, in FIG. 8 two heating elements $R_{L4}$ and $R_{L2}$ are connected in series by two different lines $L_1$ and $L_2$, so that they are driven jointly by the regulator unit 6. In addition, in this example the heating elements $R_{V1.1}$, $R_{V2.1}$ and $R_{V2.2}$ of all line connectors are connected in parallel and accordingly are likewise also driven jointly by the regulator unit 6. But each individual branch driven by the regulator unit 6 can also be any other connection in parallel and/or series of at least two individual heating elements each.

In addition, means for monitoring the level of the supply voltage U and for the automatic adjustment of the regulator to the particular supply voltage U are preferably provided.

Further advantageous embodiments will be explained below with reference to the method of regulation according to the present invention.

A characteristic diagram can be stored in the regulator unit 6—in particular in the form of a stored table—for determining the desired value. This characteristic diagram can consist of the parameters heating power, ambient temperature, operating temperature of the fluid system, certain geometric parameters, the predefined thawing time and/or the like. In addition, the rate of temperature change (dT/dt), the rate of resistance change (dR/dt) and/or the rate of geometry change (for example, ds/dt) can also be stored in the characteristic diagram. The latter in particular takes into account changes in the fluid volume during freezing or thawing, by detecting an axial and/or radial path change by means of suitable sensors.

Advantageous possibilities for this kind of sensor system to determine the aggregate state of a medium in a fluid line will be described below by way of example.

The publication WO 2009/040223 A2 describes a connection device in the form of a line-plug-connection with retaining means configured in such a manner that—starting from a normal operating position—a plugged-in and locked plug section can be moved along a defined path against a reset force relative to the connecting part in order to enlarge a volume within the connecting part holding the medium. So, for instance, the frozen medium (e.g. urea solution) can expand. In order to detect if the medium is frozen or not, or if the media line is ready for use of not, electric measuring means can be integrated for the evaluation of the aggregate state of the flowing medium.

Since the frozen medium expands, a path measurement unit can be integrated. This can be carried out for example, via the so-called Wiegand effect, via piezo elements (capacitive sensors) with Hall generators (inductive sensors) or also via an active resonant circuit (active sensors). Furthermore, a light signal (laser signal) can be introduced by means of a fiberglass cable into the connecting device in order to measure the change in reflection therewith. It is also conceivable to measure the path change by using a strain gauge.

1. Piezo Element
   Piezo elements are attached and arranged such that they are elastically deformed by an axial path change due to the volume dilatation of the frozen medium.
2. Hall Sensor
   The path is measured via at least one Hall sensor. The axial path change due to the volume dilatation is measured.
3. Strain Gauge (DMS)
   These strain gauges are attached such that an axial/radial volume dilatation (path change) can be measured.
4. Wiegand Sensor
   A Wiegand wire is designed as a spring element through which the Wiegand effect is generated. The spring element holds a piston against the operating pressure of the fluid medium in a stable position, but alternatively can also be attached as an overload spring.
   The Wiegand wire consists of a special alloy:
   jacket hard magnetic metal
   core soft magnetic metal
   Sudden reversal magnetism occurs in the core. This magnetism reversing voltage pulse can be measured by means of a coil which surrounds the Wiegand wire, and the aggregate state of the fluid can be evaluated therewith.
5. Introduction of Light Signals/Laser Pulse; Sensors Using Light Dispersion
   The connector is transparent to laser light in the shaft region of the fluid line so that a laser can be pulsed directly into the medium through the shaft of the connector and thus the reflection of the medium, the deflection of the light and/or the passage of the light out to the other side of the connector can be measured in receivers (light sensors) which are arranged radially at the shaft of the connector, and thus the aggregate state of the medium (frozen, fluid) and/or the absence of the medium can be determined.
6. Active Oscillating Circuit, Sensor Using Frequency Change
   A coil as a sender and a second coil as a receiver are arranged in such a manner that the medium is located between these coils. A frequency is supplied to the sender coil so that an electromagnetic field is generated. This generated field (the field intensity) is picked up by the receiver. The changes in field intensity can be measured and evaluated to determine the various aggregate states.

Furthermore, by means of an empirical formula as a function of temperature (in the heating element) and of time, or of the rate of change of the heating element resistance values (dR/dt≠0) or by a corresponding characteristic diagram it can be determined whether the frozen fluid has thawed or whether there is any fluid present at all, and if the fluid line is ready for use.

It is also possible to monitor the PWM mark-to-space ratio m over time. If the PWM mark-to-space ratio m remains constant in a definite range over a certain time, that is, the heating power remains constant and ultimately also the temperature in the heating element, since the resistance of the heating element and/or the rate of change of the resistance values remains constant, it can be determined via a characteristic diagram whether the frozen medium has thawed or whether any medium is present and has thawed, and if the fluid line is ready for use.

In addition, a temperature sensor for the outside/ambient temperature and/or for the inside temperature in the fluid and/or a suitable sensor can optionally be integrated for the detection of a change in fluid volume, for example by means of a path measurement, in order thus to predefine different parameters for the regulation and for example to keep the heating temperature constant.

In addition, there is an advantageous possibility to detect and to determine the respective fluid. Thus the thawing behavior of the respective medium can be described by means of a characteristic diagram stored in the regulating unit, for example, via the change in temperature and the time difference. By comparing this stored characteristic diagram it can be detected which medium is involved, for example, if it is in fact an SCR medium (aqueous urea solution) or not. Due to this advantageous measure any possible incorrect fueling of the vehicle can be detected.

Moreover, the temperature can be measured indirectly. Based on data from the heating element (electric resistance and geometric data, for example, diameter or cross section and length of a heat conductor) and the voltage at the resistor of the heating element obtained by a constant power supply, the existing temperature and/or a temperature range in the heating element can be calculated (via the temperature-dependent resistance).

The heating system according to the present invention can advantageously be included in an on-board diagnostic system (OBD). Thus, the system according to the present invention, in particular the regulating unit 6, can be connected to a unit known as a CAN-BUS (interface to the OBD). Via this connection the temperature can be read via an ID in order thus to predefine different parameters for the regulation, and/or to predefine the power supplied for the regulation by checking the characteristic diagram, and to keep the heating temperature constant, for example, or to switch the heating off in order to save energy in certain operating states. Advantageously, the regulator according to the present invention automatically conducts a functional test and an error diagnosis of the line and outputs the information to the OBD unit by means of the CAN-BUS to determine if the line is ready or not. This means that the OBD does not output a signal to the regulator to start the functional tests of the line, but this is rather conducted by the heating system or by the regulator unit itself according to the present invention.

With respect to the PWM control explained above, it should additionally be mentioned that a preferred PWM frequency band is in the range from 0.1 Hz to 1 kHz due to the thermal inertia of the system. In this case a period of 50 ms, i.e. a frequency of 20 Hz is preferably predefined.

Owing to the regulator according to the present invention, all heating elements (for all components of the fluid line system 1, in particular for the line connectors V1, V2) can have the same design, i.e. with the same properties/values, because the heating power can be adjusted individually via the regulator. Thus, the heating elements, in particular the line connectors, can also be made of the same heat conducting material, for example, and thus be manufactured independently.

Additional sensors can be used within the scope of the system according to the present invention:
- inside/outside temperature sensors
- inside/outside pressure sensors (especially strain gauges to detect a change in volume or pressure upon freezing or thawing of the fluid)
- temperature switches for thaw/freeze detection, wherein any reference medium (urea solution or other) is located outside the fluid line in a hermetically sealed container, wherein this container is connected to a pressurized can. The pressurized actuates a switch contact.
- temperature-dependent resistance measurement
- rate of resistance change dR/dt The system according to the present invention operates in a low loss environment; the regulator does not require a cooling element.

Error detection and error evaluation with respect to the line system and in particular a feedback to the OBD Unit is possible by means of the regulator, in particular to detect whether the system is operational. The following criteria are taken into account, for example:
- defective line (short circuit, over-temperature in the driver)
- line too hot
- line does not warm up
- no fluid in the line
- battery voltage outside a defined operating range
- sensor signal outside the operating range
- resistance values outside the operating range Based on the control of the heating elements with PWM-pulses, measures should be taken for electromagnetic compatibility (EMV):
- use of shielded lines/cables
- shielded housing for the regulation
- housing material itself is electrically conducting
- install metal foil (e.g. aluminum) in the housing (gluing, lining)
- shielding around all heating elements, i.e. in the region of the line casing 4 and in the region of the housings 2 of the line connector, wherein this shield can be glued or not glued and can be configured as
  - braided wire
  - braided foil
  - (wound, if necessary self-adhesive) foil which can be also be conveniently used as heat protection
- the shielding can in particular be used for attaching the heating element in the region of the fluid line.

The invention is not limited to the illustrated and described exemplary embodiments, but also covers all equivalent embodiments within the meaning of the invention. Furthermore, the invention is also not restricted to the combination of characteristics defined in the respective independent claim, but can also be defined by any other combination of certain characteristics of all disclosed, individual characteristics. This means that basically virtually any individual characteristic of the respective independent claim can be omitted and/or replaced by at least one individual characteristic disclosed elsewhere in the application. In this respect the claims are to be understood solely as an initial attempt at a formulation of an invention.

The invention claimed is:

1. A method for heating a fluid line system of a motor vehicle, the fluid line system including a fluid line having a pair of line connectors at ends of the fluid line, the method comprising the steps locating at least two electric heating elements on the fluid line system with one of the heating elements being provided with one of the line connectors and another of the heating elements being provided with the fluid line, electrically connecting and operating the heating elements in parallel and separately supplying each heating element with a controlled operating current for adjusting its heating power, wherein each heating element is separately supplied with its own operating voltage, and each operating voltage is generated from a supply voltage by means of a PWM controller clocked to regulate the heating power with a defined mark-to-space ratio, wherein the respective operating current results from an effective value of the clocked operating voltage and a respective existing resistance of the heating element, wherein successive locations within the heating line system are in fluid communication with each other and subjected to different heating power along the heating line system.

2. A method according to claim 1, a respective actual heating power of each heating element is regulated by varying the PWM mark-to-space ratio to a predefined desired heating power.

3. A method according to claim 1, further comprising the steps of initializing at the start of operation the existing resistance for each heating element once in one measuring cycle, and then subsequently cyclically during operation, and that from the existing resistance the PWM mark-to-space ratio is determined for the respectively predefined desired heating power.

4. The method according to claim 3, wherein that in each measuring cycle with the operating current temporarily shut off, a defined constant measuring current is sent through the respective heating element, a resulting voltage drop is calculated, and the existing resistance is then determined from these values.

5. A method according to claim 4, wherein the heating elements are driven at a time offset with respect to the PWM controller, such that the PWM signals do not, or only partly overlap in time.

6. A heated fluid line system for a motor vehicle, the heated fluid line system comprising a fluid line having a line connector at each end thereof, at least two electric heating elements, one of the heating elements provided with the line connector and the other of the heating elements provided with the fluid line, the heating elements being connected in parallel and configured to be operated electrically in parallel by way of a separate control element wherein each heating element is configured to be controlled via its associated control element for the individual adjustment of its heating power, the control elements being connected to and configured to be driven by a regulating unit for individually regulating the heating power of the heating elements, each control element being formed by a transistor that is configured to be controlled via a driver circuit of the regulating unit, each of the driver circuits being configured to be driven via a pulse width modulator with a variable mark-to-space ratio for the adjustment of the heating power.

7. A heated fluid line system according to claim 6, wherein at least one of the heating elements includes several individual heating elements connected in series and/or in parallel.

8. A heated fluid line system according to claim 6, wherein the regulating unit is housed in a connection housing arranged in the region of a line or a line connector.

9. A heated fluid line system according to claim 6, wherein the regulating unit includes a microcontroller configured to adjust the mark-to-space ratio of the PWM modulator for each of the heating elements to be controlled.

10. A heated fluid line system according to claim 6, wherein the regulating unit has a constant power supply with a downstream switching device, via which a constant measuring current can be sent through each heating element in one measuring cycle with the operating current switched off, wherein the regulating unit is designed such that based on the constant measuring current and a thereby decreasing voltage applied to the respective heating element, the existing resistance of the heating element is calculated, wherein during subsequent operation, the particular heating power is determined for each heating element based on the operating voltage or on the resulting operating current and on the resistance calculated in the preceding measurement cycle.

11. The heated fluid line system according to claim 10, wherein the regulating unit is configured to regulate the actual value to the desired value by comparing the actual value of the respective heating power to a predefined, desired value and by varying the PWM mark-to-space ratio.

* * * * *